United States Patent [19]
Nellis

[11] 3,878,398
[45] Apr. 15, 1975

[54] SYSTEM FOR DETECTING GIVEN CHANGES IN MONITORED LIGHT INTENSITY

[75] Inventor: David C. Nellis, Victor, N.Y.
[73] Assignee: Itek Corporation, Lexington, Mass.
[22] Filed: Sept. 13, 1973
[21] Appl. No.: 396,919

[52] U.S. Cl. ................. 250/561; 250/206; 101/130
[51] Int. Cl. ........................................... G01n 21/32
[58] Field of Search .......... 250/559, 561, 571, 206, 250/214 R; 356/212; 101/130

[56] References Cited
UNITED STATES PATENTS

| | | | |
|---|---|---|---|
| 3,451,756 | 6/1969 | Young | 356/212 |
| 3,593,065 | 7/1971 | Domalski et al. | 250/206 X |
| 3,699,349 | 10/1972 | Paulus et al. | 260/560 |
| 3,812,372 | 5/1974 | Wirtz et al. | 250/561 |

Primary Examiner—Walter Stolwein
Attorney, Agent, or Firm—Homer O. Blair; Robert L. Nathans; Gerald H. Glanzman

[57] ABSTRACT

An improved detecting system useful for detecting the presence of white paper caught in the printing station of a duplicating machine comprising a light monitoring circuit coupled to a peak memory storage capacitor which in turn is coupled to an integrating capacitor via a coupling resistor. A voltage comparator is coupled across the coupling resistor to produce an output signal indicative of a predetermined difference in voltage between the voltage across the peak memory capacitor and the voltage across the integrating capacitor. The output of the voltage comparator is anded with a paper feed signal to produce a jam signal indicative of paper jamming in the printing station.

10 Claims, 2 Drawing Figures

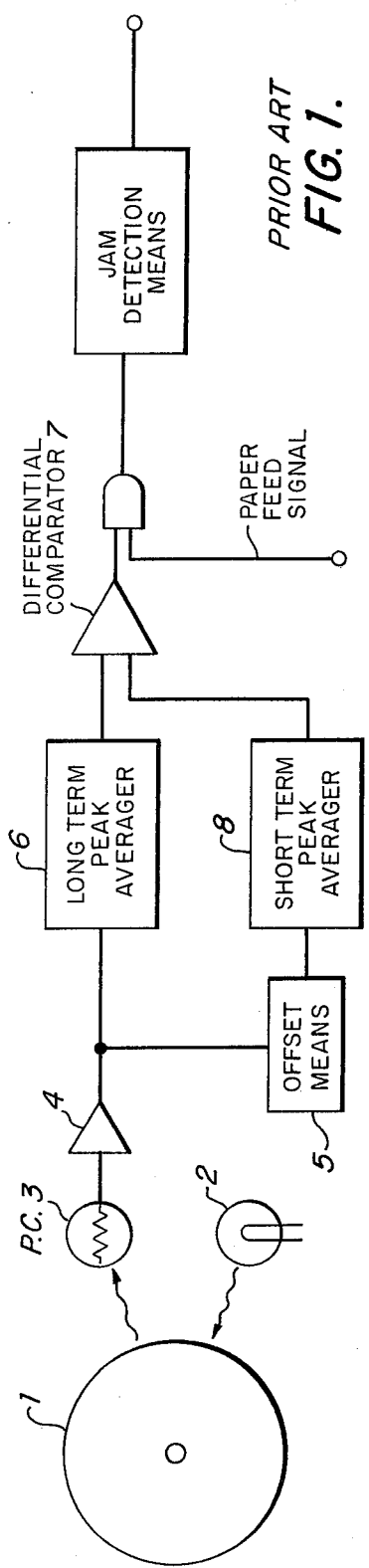
*PRIOR ART* FIG. 1.
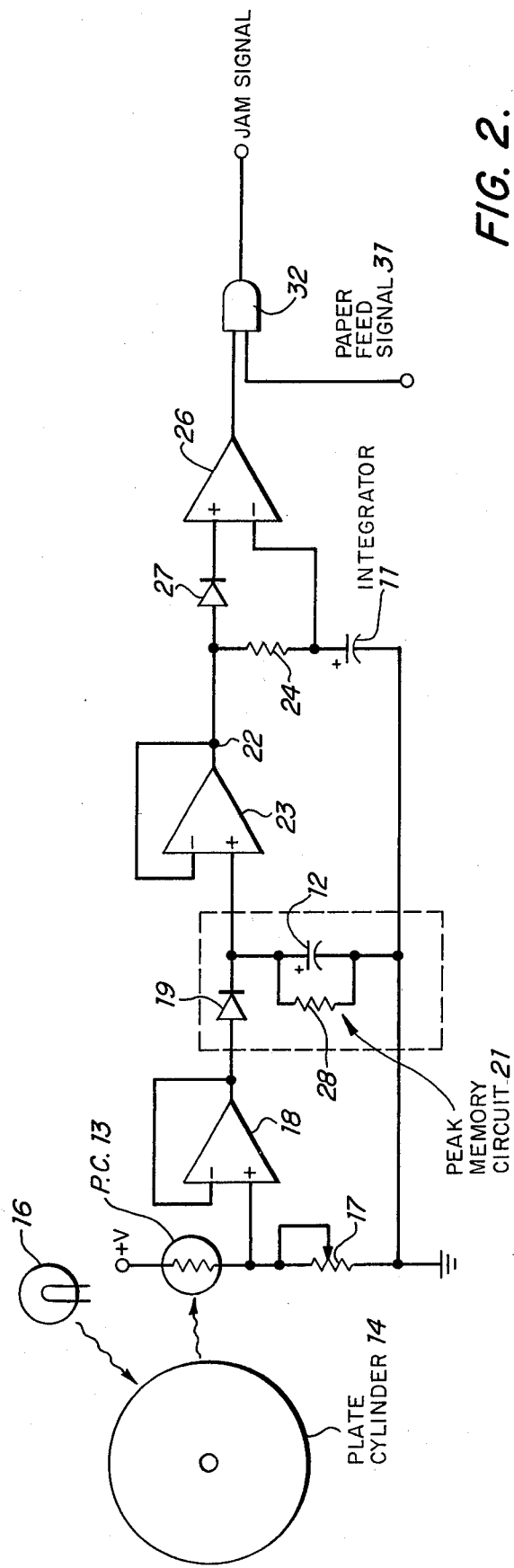
FIG. 2.

SYSTEM FOR DETECTING GIVEN CHANGES IN MONITORED LIGHT INTENSITY

BACKGROUND OF THE INVENTION

This invention relates to systems for detecting predetermined changes in light intensity.

In a copier-duplicator machine, a printing plate is inked upon a printing drum during the first few revolutions of the drum. After inking is completed, a paper feed system is activated which feeds a sheet of paper during each revolution of the printing drum to cause the inked image upon the printing plate to be transferred to the paper. Upon occasion, a sheet of paper becomes captured within the printing drum station and the machine must be shut down.

In U.S. Pat. No. 3,593,065 a relatively complex apparatus is disclosed for performing the above-stated functions. This apparatus functions basically as a differentiator by virtue of series circuit C-4 and R-3 in FIG. 3. It is desirable to utilize voltage comparison techniques employing a floating voltage reference level, rather than differentiation, because sharp increases in reflected light seen by the photodetector are occasionally produced which are not indicative of the detection of a white sheet of paper caught in the printing drum station. For example, where the paper printing plate is light pink and large image areas are covered with black ink, plate highlight (uninked) areas may cause a sudden increase in the detected light which can produce spurious paper jam detection indications. In copending patent application Ser. No. 318,129 and now U.S. Pat. No. 3,812,372 filed Dec. 26, 1972, and assigned to the same assignee as the present invention, a long term peak averaging circuit and a short term peak averaging circuit are coupled in parallel to a comparator. This circuit has been found to be somewhat unreliable for reasons to be set forth below.

SUMMARY OF THE INVENTION

In accordance with a preferred embodiment of the present invention, a light monitoring circuit is connected to a peak memory circuit which stores a charge proportional to the highest light intensity previously seen by the photocell. The output of the peak memory circuit is coupled to an integrator which also produces a voltage proportional to the highest light intensity seen by the photodetector after a short period of time. Should the photocell sense an abrupt increase in light intensity, over and above increases in intensity due to the aforementioned plate highlight areas, a surge of current will pass from the peak memory circuit into the integrator via a coupling resistor to produce a sufficient IR drop across the coupling resistor to cause a voltage comparator to produce an output signal which, when anded with a paper feed signal, produces a paper jam signal to shut off the machine.

BRIEF DESCRIPTION OF THE DRAWINGS

FIG. 1 illustrates the system of the aforesaid copending patent application employing a long term peak averager and a short term peak averager coupled in parallel to a differential comparator.

FIG. 2 discloses an improved jam condition detector embodying the present invention.

SPECIFIC DESCRIPTION

In FIG. 1, printing drum 1 is illuminated by light source 2 and monitored by photocell 3 which is coupled to amplifier 4. A light colored, e. g. pink, paper printing plate is affixed to the drum and is inked by an inking system not shown. After several revolutions of the drum, long term peak averager 6 presents a voltage to a first terminal of the comparator 7. Short term peak averager 8, which has a time constant substantially smaller than the time constant of peak averager 6, presents an output voltage to the second terminal of comparator 7, indicative of the average light flux seen by the photocell 3 during a substantially shorter time period relative to the longer integrating time period of averager 6. The short term averager produces a voltage higher than the voltage produced by long term averager 6 upon the detection of white paper at the printing station. Although it is true that pink highlight (non-inked) areas produce an increase in the output voltage of short term averager 8, it was believed that these highlight areas would also sufficiently increase the output voltage of long term averager 6, so that the differential comparator would not produce an output signal upon the detection of such pink highlight areas. In practice it has been found that the response of the long term averaging circuit 6 is too sluggish in responding to the detection of pink highlight areas and thus comparator 7 upon occasion produces output signals due to the detection of pink highlight areas.

In accordance with one embodiment of the invention, a floating reference voltage is produced by integrator capacitor 11 of FIG. 2, which is coupled to the output circuit of a non-averaging peak memory circuit 21. Unlike FIG. 1, this capacitor is not averaging but will, after a short time, store a voltage proportional to the brightest highlight area previously seen.

A photocell 13 monitors the light condition at the surface of plate cylinder 14, which is illuminated by light source 16. Variable resistor 17 is employed for sensitivity adjustment purposes. Voltage follower circuit 18 is coupled to peak memory capacitor 12 through diode 19. The output terminal 22 of voltage follower 23 is coupled to integrator capacitor 11 via resistor 24. Voltage comparator 26 is coupled across resistor 24 via diode 27 as shown. Bleeder resistor 28 having a relatively high impedance, may be coupled across peak memory capacitor 12 to provide for slow discharge of capacitor 12. In practice, capacitor 12 may be leaky enough so that a bleeder resistor is not required.

A relatively high light reflecting paper plate is mounted upon cylinder 14 and during the first few revolutions thereof takes up ink in preparation for printing. At this time, paper is not fed into the print station and thus no paper feed signal is present on conductor 31 coupled to AND gate 32. Upon the detection of plate highlight areas, that is those areas not having ink thereon, signals indicative of increased light reflectivity pass through diode 19 and voltage follower 23 to slowly charge integrator capacitor 11 via resistor 24. Peak memory capacitor 12 will, however, rapidly charge to a voltage representative of the highlight area having the highest light reflectance, since a series resistor such as resistor 24 is not coupled between peak memory capacitor 12 and diode 19. During the first few revolutions of the drum, current through resistor 24 causes voltage comparator 26 to produce an output during the charging of integrator capacitor 11. However, since no paper feed signal is present on conductor 31, AND gate 32 does not produce an output signal for actuating paper jam circuitry, not shown. Before paper is fed to the printing station, integrator capacitor 11 will be charged to a voltage substantially equal to the voltage produced by peak memory capacitor 12, and thus the voltage across resistor 24 will become insufficient to actuate voltage comparator 26.

Paper is now fed to the printing station and the printing cycle commences. If all goes well, the system continues to monitor plate highlight areas just as before, but these highlight areas will not cause a significant increase in the voltage across peak memory capacitor 12 and thus no output signal is produced by voltage comparator 26 due to the absence of a sufficient voltage drop across resistor 24. Capacitor 12 "remembers" voltage peaks instantaneously, while capacitor 11 takes a small amount of time to charge to the same peak voltage. This is due to RC time constant of capacitor 11 and resistor 24.

Now let it be assumed that a sheet of white paper becomes caught in the printing drum station to produce an increased voltage at the output terminal of voltage follower 18. Diode 19 is forward biased and peak memory capacitor 12 will abruptly be further charged and current will flow through resistor 24 into integrator capacitor 11. This action produces a voltage across resistor 24 sufficient to overcome the offset voltage of diode 27 and thus an output signal is transmitted by voltage comparator 26 to the upper terminal of AND gate 32. Since AND gate 32 is now enabled by a paper feed signal present on its lower input terminal, a jam signal is produced by AND gate 32, to in turn stop the press.

In summary, the present invention is able to detect relatively small increases in light representative of a paper jam condition in the printing circuit and yet is not susceptible to being occasionally actuated by sudden increases in light due to printing plate highlight areas.

The present invention may be employed to detect small changes in perceived light in virtually any environment. It is believed that the present invention is particularly suitable to detect relatively small increases in light intensity in an environment where high averaged or ambient light intensity conditions exist. The system is equally applicable to light transmitted through a medium such as photographic film rather than reflected off of a medium. The system is also suitable for detecting dips in light intensity below a predetermined level rather than peaks.

While a preferred embodiment has been described, the teachings of this invention will suggest many other embodiments to those skilled in the art.

I claim:

1. A system for detecting given changes in perceived light intensity comprising:
   a. monitoring means for producing a signal proportional to perceived light intensity;
   b. peak memory means coupled to the output circuit of said monitoring means for storing a signal indicative of the highest intensity light signal monitored by said monitoring means;
   c. integrating means coupled to the output circuit of said peak memory means for storing a signal indicative of the highest intensity light signal monitored by said monitoring means after a period of time longer than that required by said peak memory means; and
   d. signal generating means for producing an output signal upon the occurrence of a given difference between the signal produced by said peak memory means and the signal stored in said integrating means due to a predetermined change in light intensity monitored by said monitoring means.

2. The combination as set forth in claim 1 wherein impedance means is coupled between said integrating means and said peak memory means and a voltage comparator is coupled across said impedance means for producing an output signal upon the occurrence of a predetermined surge of current through said impedance means due to a predetermined change in the light intensity monitored by said monitoring means.

3. The combination as set forth in claim 2 wherein said peak memory means includes a memory capacitor for storing a charge proportional to a signal produced by said monitoring means indicative of the highest light intensity monitored.

4. The combination as set forth in claim 3 wherein said integrating circuit includes an integrating capacitor for storing a charge indicative of the highest light intensity monitored by said monitoring means.

5. The combination as set forth in claim 4 further including a first voltage follower coupled between said monitoring means and said peak memory capacitor and a second voltage follower coupled between said peak memory capacitor and said integrating capacitor.

6. A system for detecting the presence of high reflectivity copy paper in the neighborhood of a printing plate comprising:
   a. monitoring means for producing a signal proportional to light intensity reflected by said printing plate;
   b. peak memory means coupled to the output circuit of said monitoring means for storing a signal indicative of the highest intensity light signal reflected off of said printing plate;
   c. integrating means coupled to the output circuit of said peak memory means for storing a signal indicative of the highest intensity light signal reflected off of said printing plate after a period of time longer than that required by said peak memory means; and,
   d. a jamming signal generating means for producing an output signal upon the occurrence of:
      1. a given difference between the signal produced by said peak memory means and the signal stored in said integrating means caused by the presence of copy paper in the neighborhood of said printing plate and
      2. the feeding of copy paper.

7. The combination as set forth in claim 6 wherein impedance means is coupled between said integrating means and said peak memory means and a voltage comparator is coupled across said impedance means for producing an output signal upon the occurrence of a predetermined surge of current through said impedance means due to a predetermined change in the light intensity monitored by said monitoring means.

8. The combination as set forth in claim 7 wherein said peak memory means includes a memory capacitor for storing a charge proportional to a signal produced by said monitoring means indicative of the highest light intensity monitored.

9. The combination as set forth in claim 8 wherein said integrating circuit includes an integrating capacitor for storing a charge indicative of highest light intensity monitored by said monitoring means.

10. The combination as set forth in claim 9 further including a first voltage follower coupled between said monitoring means and said peak memory capacitor and a second voltage follower coupled between said peak memory capacitor and said integrating capacitor.

* * * * *